USA U.S. Patent 4,942,961

United States Patent [19]
Focke et al.

[11] Patent Number: 4,942,961
[45] Date of Patent: Jul. 24, 1990

[54] CIGARETTE PACK, ESPECIALLY HINGE-LID PACK

[75] Inventors: Heinz Focke; Kurt Liedtke, both of Verden, Fed. Rep. of Germany

[73] Assignee: Focke & Co. (GmbH & Co.), Verden, Fed. Rep. of Germany

[21] Appl. No.: 467,330

[22] Filed: Jan. 19, 1990

Related U.S. Application Data

[63] Continuation of Ser. No. 318,394, Mar. 3, 1989, abandoned.

[30] Foreign Application Priority Data

Mar. 3, 1988 [DE] Fed. Rep. of Germany ....... 3806818

[51] Int. Cl.⁵ .................. A24F 15/00; B65D 85/10
[52] U.S. Cl. .................................. 206/254; 206/255; 206/804; 229/87.13; 229/160.1
[58] Field of Search ............... 206/254, 804, 249, 255, 206/273; 229/87 C

[56] References Cited

U.S. PATENT DOCUMENTS

| | | | |
|---|---|---|---|
| 963,229 | 7/1910 | Leighton | 206/254 X |
| 1,928,663 | 10/1933 | Georger | 206/254 X |
| 2,984,384 | 5/1961 | Chalmers et al. | 229/87 C |
| 4,664,310 | 5/1987 | Schmidt | 206/254 |

*Primary Examiner*—Paul T. Sewell
*Assistant Examiner*—Jacob K. Ackun, Jr.
*Attorney, Agent, or Firm*—Sughrue, Mion, Zinn, Macpeak & Seas

[57] ABSTRACT

Cigarette groups (11) are wrapped in an inner blank (16) made of tinfoil or the like within a cigarette pack designed as a hinge-lid pack. To make it easier to extract cigarettes (12), the inner blank (16) is equipped with a flap (26) which can be pulled off as a result of punching lines (27).

To make it even easier to extract cigarettes (12), the inner blank (16) is equipped, by means of lateral punching lines (31, 32), with a lift-out strip (30) which makes it possible to lift a number of cigarettes (12) in order to extract them. The lift-out strip (30) extends by means of a gripping tab (34) into the region of the flap (26). When the latter is pulled off, the gripping tab (34) is exposed, in such a way that it projects from the opened cigarette pack and can be grasped by hand. The lift-out strip (30) is connected permanently to the inner blank (16) as part of the latter.

2 Claims, 3 Drawing Sheets

CIGARETTE PACK, ESPECIALLY HINGE-LID PACK

This is a Continuation of Application No. 07/318,394 now abandoned, filed 03/03/89.

BACKGROUND OF THE INVENTION

The invention relates to a cigarette pack, especially a hinge-lid pack, in which a cigarette group is wrapped in an inner blank, with a flap separable from the inner blank by pulling off as a result of punchings (perforations), the flap adjoining a lift-out strip which extends in a front wall of the inner blank at least into the region of a bottom wall of the latter.

The invention is mainly concerned with (cigarette) packs designed as hinge-lid packs. This type of pack in very widespread use throughout the world is constructed by attaching to a pack part a hinge-lid which is connected to a rear wall of the pack part by means of a hinge connection. In such hinge-lid packs, the pack part conventionally has attached to it a collar which extends in the region of the front wall and side walls of the pack part and which projects partially from this.

The pack content, in particular a cigarette group, is conventionally wrapped in an inner blank made of tinfoil. This inner blank is folded round the pack content (cigarette group) in such a way that folding tabs of the inner blank which partially overlap one another are formed in the region of the vertical narrow side face and in the region of an upper end face.

The customary construction of a hinge-lid pack or of an inner blank of the latter includes a pull-off flap marked by punchings or perforations. When the cigarette pack is to be used, this flap is pulled off in such a way as to expose a region of the pack content which faces the front wall of the pack. The pull-off flap includes an upper region of the front wall projecting from the pack part and the adjacent parts of the side wall. Furthermore, a front part of the end wall of the inner blank is removed together with the flap.

In a type of pack of this kind, it is already known to attach a lift-out strip as part of the inner wrapping (German Offenlegungsschrift No. 3,410,217). The function of the lift-out strip is to lift part of the pack content, particularly some cigarettes especially at the front, by pulling, so as to make it easier to extract them from the pack. In the known pack, the lift-out strip is marked by punchings (severing cuts with residual connections) in the region of a front wall, a bottom wall and part of a rear wall of the inner blank. An upper end of the lift-out strip is connected to the pull-off flap. When the flap is pulled off, therefore, the lift-out strip is actuated at the same time and is finally torn off and pulled out of the pack.

In this known version of a cigarette pack, the lift-out strip integrated in the inner blank can be actuated only once, in particular when the flap is being pulled off. After that, that is to say during the extraction of further cigarettes, the lift-out strip can no longer be activated because it has been pulled out of the pack.

SUMMARY OF THE INVENTION

Starting from this, the object on which the invention is based is to provide a (cigarette) pack of the type mentioned in the introduction, in which a lift-out strip which is integrated with the inner blank and which can be used several times is provided.

To achieve this object, the pack according to the invention is characterized in that the lift-out strip is delimited from the pull-off flap by punchings (perforations), in such a way that the flap, when being pulled off, can be separated from the lift-out strip.

Accordingly, in the design according to the invention of the cigarette pack, the lift-out strip is also an integral part of the inner blank and extends as far as the pull-off flap. As soon as the cigarette pack is used and therefore the flap pulled off, the latter comes away from the lift-out strip, so that, in order to lift individual cigarettes, this can be actuated independently of the pull-off flap, specifically several times if appropriate.

In an especially advantageous embodiment of the invention, the lift-out strip extends into the region of the pull-off flap, and a gripping tab at the upper end of the lift-out strip is delimited in the region of the pull-off flap by an appropriate perforation (U-shaped perforation lines) and is exposed when the flap is pulled off.

Thus, when the flap is pulled off, a gripping tab of a lift-out strip designed as part of the inner blank is always exposed. At least this gripping tab projects from the box part of the pack or from the region of the collar and can consequently be actuated easily.

An exemplary embodiment of the invention is explained in detail below by means of the drawings. In these:

DETAILED DESCRIPTION OF A PREFERRED EMBODIMENT

Figure 3:
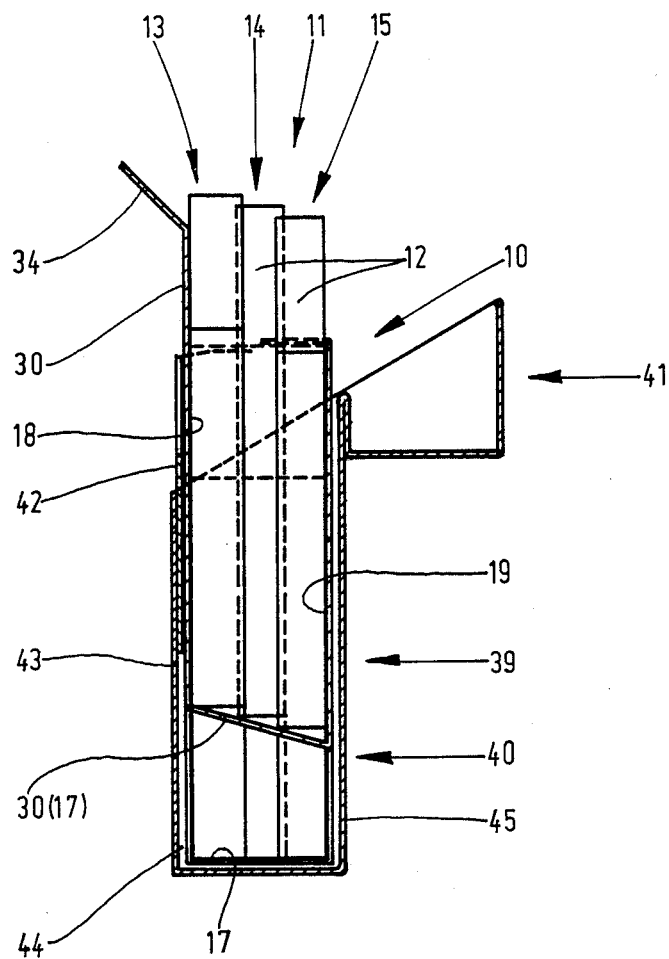
FIG. 3 shows a vertical section through a cigarette group wrapped in an inner blank, with the lift-out strip actuated, in an open hinge-lid pack.

The drawings show details of the content of a hinge-lid pack 39. The hinge-lid pack 39 (FIG. 3) is of conventional design, and in particular consists of a pack part 40 and of a hinge-lid 41 connected pivotably to this. Arranged in the pack part 40 is a collar 42 which extends in the region of the pack front wall 43 and pack side walls 44. The collar is connected to the abovementioned pack walls by adhesive bonding and projects from the pack part 40. In the closing position, this part is surrounded by the hinge-lid 41.

The pack content is a block-like structure, particularly a cigarette block 10. This consists of a cigarette group 11 composed of a plurality of cigarettes 12 which are arranged in rows, in this particular case three rows 13, 14, 15, and which are surrounded by an inner blank 16.

Figure 1:
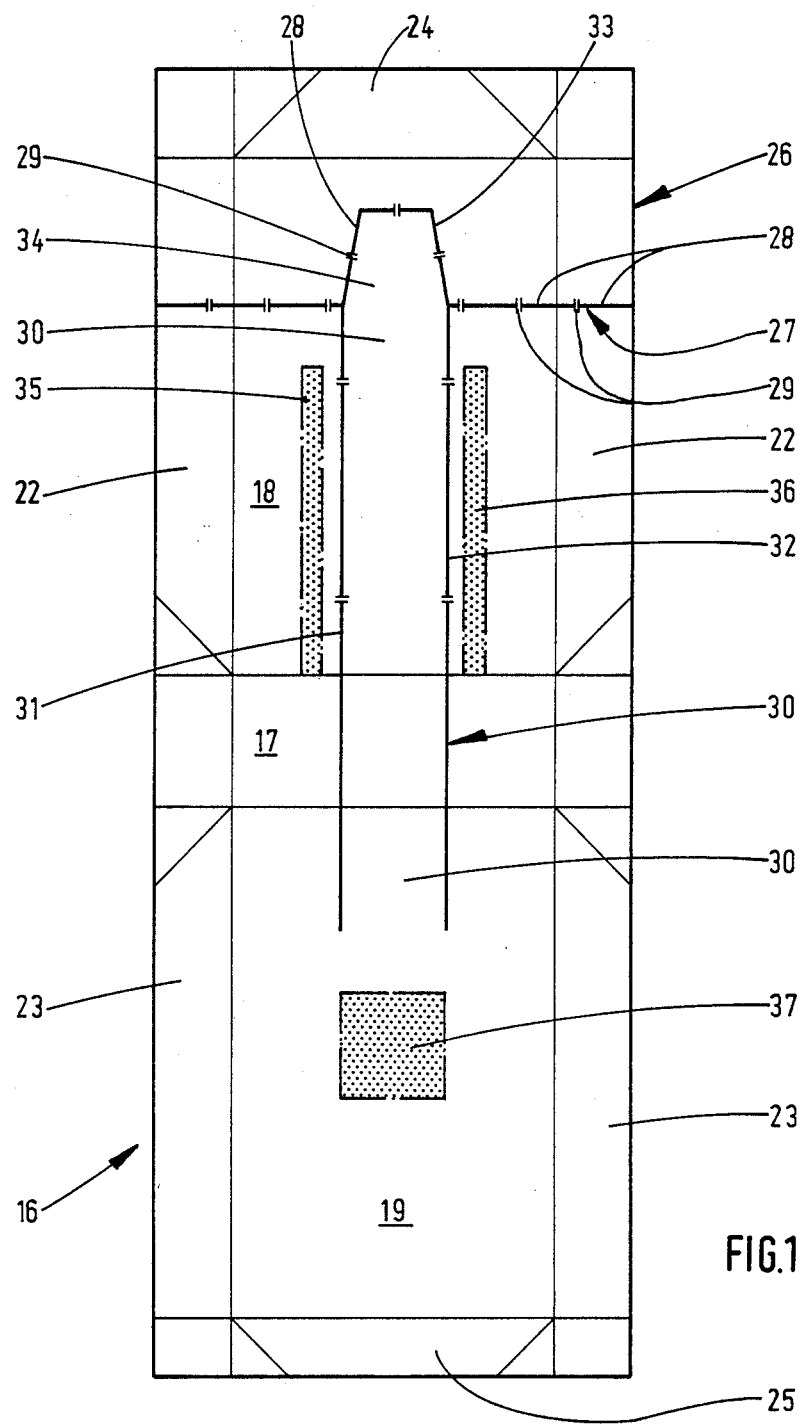
FIG. 1 shows a spread-out inner blank (tinfoil) for a cigarette pack.

The inner blank 16 conventionally consists of tinfoil. As is evident from FIG. 1, the inner blank 16 has a rectangular shape. To form the cigarette block 10, the inner blank 16 is folded round the cigarette group 11 in such a way that a closed bottom wall 17, a front wall 18 and a rear wall 19 are obtained. Side walls 20 and 21 are formed by side-wall tabs 22, 23 partially overlapping one another and connected to the front wall 18 and rear wall 19. An upper end wall 38 located opposite the bottom wall 17 likewise consists of end-wall tabs 24 and 25 which partially overlap one another and which are connected on the one hand to the front wall 18 and on the other hand to the rear wall 19 of the inner blank 16.

In order to expose an upper region of some of the cigarettes 12 when a cigarette pack of such a design is to be used, the inner blank 16 is equipped with a tear-off or pull-off flap 26. This extends in the upper region of the front wall 18 and of the adjoining side-wall tabs 22 and end-wall tab 24. The inner blank 16 is folded in such a way that the end-wall tab 24 is on the outside and can therefore be grasped when the cigarette pack is to be used. The flap 26 is separated from the remaining part of the inner blank by being pulled in an upward direction.

For this purpose, the flap 26 is delimited from the remaining part of the inner blank 16 by a punching line 27 directed essentially transversely in the blank region which is surrounded by the pack collar 42. The punching line 27 consists of severing cuts or punchings 28 and of residual connections 29. The latter are severed when the flap 26 is pulled off.

The particular feature of the cigarette pack is a lift-out strip 30 which is marked within the inner blank 16, specifically in the middle of the latter in the exemplary embodiment illustrated. The lift-out strip 30 is marked by lateral punching lines 31, 32 and extends within part of the front wall 18 along the bottom wall 17 and into the rear wall 19, in particular in the lower region of the latter. The arrangement is such that the lateral punching lines 31, 32 have a few residual connections 29 in the region of the front wall 18, whilst in the region of the bottom wall 17 and the rear wall 19 the lateral punching lines 31, 32 are continuous.

The lift-out strip 30 extends as far as the flap 26, into the region of the latter in the exemplary embodiment illustrated. The lift-out strip 30 is likewise delimited from the pull-off flap 26 by an easily severable flap punching line 33 which, in the exemplary embodiment shown, is made U-shaped or has the contours of a truncated cone. Thus, the lift-out strip 30 extends with an upper end region within the flap 26. This end region forms a gripping tab 34 of the lift-out strip 30.

Figure 2:
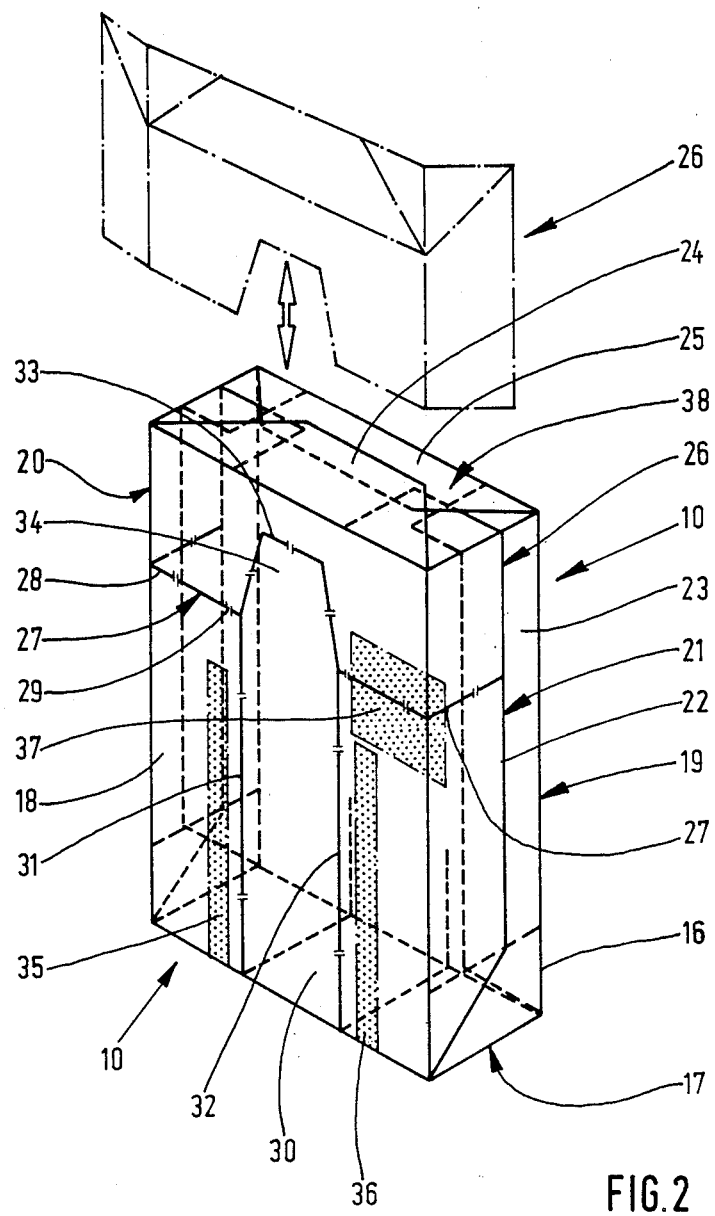
FIG. 2 shows a perspective representation of a cigarette group wrapped in an inner blank as the content of a pack.

When the flap 26 is pulled off in order to use a cigarette pack designed in this way, the lift-out strip 30 remains within the cigarette pack. The exposed gripping tab 34 projects from the pack part 40 or from the region surrounded by the collar 42 and can be grasped by hand. By pulling the lift-out strip 30, several of the cigarettes 12 located in the middle of the cigarette group 11 are lifted through the hinge-lid 41, specifically cigarettes of the three rows 13, 14, 15 offset in steps relative to one another. Cigarettes 12 can thus be extracted by hand very easily. When the pack is being closed, the cigarettes 12 are pressed back into this, taking with them the lift-out strip 30 which assumes the initial position and which is therefore ready for a new lifting-out operation. It is important for this multiple use of the lift-out strip 30 that it should remain anchored to the inner blank 16, particularly to the rear wall 19, firmly and not so that it can be torn off. As clearly shown in FIGS. 2 and 3, both the pack front wall 43 and the pack collar 42 are considerably shorter in height than the cigarette block 10, thereby permitting the gripping tab 34 to be structurally formed as an extension of the lift-out strip 30 in such a manner that the gripping tab 34 projects upwardly from the pack, i.e. extends substantially above front wall 43 and pack collar 42 after flap 26 is pulled off.

To prevent the entire cigarette block 10 from being lifted out of the pack (hinge-lid pack 39) when a pull is exerted on the lift-out strip 30, the inner blank 16 is anchored within the hinge-lid pack, specifically within the pack part 40, by adhesive bonding. In the present case, (two) strip-shaped adhesive bonds 35, 36 are formed in the region of the front wall 18 on both sides of the lift-out strip 30, in order to connect the inner blank 16 to the pack front wall 43. Thus, in the region of the lift-out strip 30, the cigarette block 10 is anchored especially firmly in the hinge-lid pack on both sides of the lift-out strip 30. A further adhesive bond 37, here in the form of a square, is located in the region of the rear wall 19, specifically in the extension of the lift-out strip 30. The adhesive bond 37 serves for fastening the rear wall 19 to a pack rear wall 45.

What is claimed is:

1. A hinge-lid cigarette pack having an inner blank in which a cigarette group is wrapped, said inner blank comprising;
    a pull-off flap (26) separable from the inner blank (16) by pulling off as a result of transverse punchings (27) in a front wall (18) and adjoining side tabs (22) of said inner blank (16); and wherein:
    the flap adjoins a lift-out strip (30) which has a gripping tab (34) and which extends in said front wall (18) of the inner blank (16) and at least into a region of a bottom wall (17) of the inner blank;
    the lift-out strip (30) is delimited from the pull-off flap (26) by a flap punching line (33) in such a way that the flap (26), when being pulled off, can be easily separated from the lift-out strip (30);
    the lift-out strip (30) extends into a region of the flap (26) and within the latter is delimited by an approximately U-shaped said flap punching line (33) in such a way that, when said flap (26) is pulled off, said gripping tab (34), which is free relative to the front wall (18) of the inner blank (16) and which is an upper free end portion of the lift-out strip (30), is exposed; and
    said pack (39) comprises a hinge-lid (41) pivotably connected to a rear wall (45) of a pack part (40) also having a front wall (43) in an upper region of which there is provided an internal pack collar (42) which surrounds said blank punchings (27) before flap (26) is pulled off and from which said gripping tab (34) upwardly projects after said flap (26) is pulled off from said inner blank (16).

2. Cigarette pack according to claim 1, wherein a corresponding recess is formed in said flap (26) when said gripping tab is exposed; and wherein said lift-out strip (30) is defined in said front wall (18) of said inner blank (16) by lateral punching lines (31, 32) having spaced residual connections, and in said bottom wall (17) and a rear wall (19) of said inner blank (16) by lateral punching lines (31,32) which are continuous.

* * * * *